UNITED STATES PATENT OFFICE.

NELSON PARMETER, OF GARDNER, MASSACHUSETTS.

IMPROVEMENT IN CEMENTS.

Specification forming part of Letters Patent No. 23,856, dated May 3, 1859.

*To all whom it may concern:*

Be it known that I, NELSON PARMETER, of Gardner, Worcester county, Commonwealth of Massachusetts, have invented an Improved Fire-Proof Cement; and I do hereby declare that the following is a full and exact description of the mode of making and applying my fire-proof cement, so as to enable others skilled in the art to make and use the same.

Sandstone, (found in the vicinity of Potsdam, St. Lawrence county, New York,) pipe-clay, and plaster-of-paris are each pulverized and sifted. Lime is slaked and also pulverized and sifted. These four materials, together with some salt, are then placed in a kettle over a fire, and water is added to it. The mixture is to be constantly stirred and kept boiling in a state of consistency similar to common mortar when used for building purposes. This degree of consistency is to be kept up by adding water from time to time.

As much of the mixture as is wanted for immediate use is placed in a vat, and some of the coagulated part of blood is added to it to make it ready for use.

This cement is to be applied while hot, because as soon as it cools it becomes hard. In putting this cement on, the same process ought to be followed as in hard-finish plastering.

The sandstone, pipe-clay, and plaster-of-paris are used as non-conductors of heat and for the purpose of making the cement fire-proof. The lime is used as a paste, so as to bind together the various component parts of this cement. The salt is used to cause the mixture to harden rapidly. It is also employed as a non-conductor of heat. The blood serves to harden and give efficacy to the walls.

In preparing this cement the component materials are used in the following proportions, according to weight: sandstone, one part; pipe-clay, one part; plaster-of-paris, one part; lime, four-eighths part; salt, three-eighths part; coagulated part of the blood, (called "crassamentum,") one-eighth part.

The advantages of my fire-proof cement are, first, that it is a perfect non-conductor of heat, and consequently (if used for furnaces, &c.) it confines the heat and economizes fuel; second, that it makes a fine finish and becomes exceedingly hard.

Having described my improved fire-proof cement for furnaces and other purposes, what I claim as new, and desire to secure by Letters Patent, is—

An improved fire-proof cement composed of the above ingredients, in the proportions and in the manner substantially as herein set forth.

NELSON PARMETER.

Witnesses:
A. WIDDICOMBE,
M. C. GRITZNER.